United States Patent
Fujii et al.

(10) Patent No.: US 8,339,706 B2
(45) Date of Patent: Dec. 25, 2012

(54) WIRE GRID AND MANUFACTURING METHOD THEREOF

(75) Inventors: Takashi Fujii, Otsu (JP); Shoji Zaiki, Kyoto-Fu (JP)

(73) Assignee: Murata Manufacturing Co., Ltd., Nagaokakyo-Shi (JP)

(*) Notice: Subject to any disclaimer, the term of this patent is extended or adjusted under 35 U.S.C. 154(b) by 0 days.

(21) Appl. No.: 12/708,957

(22) Filed: Feb. 19, 2010

(65) Prior Publication Data

US 2010/0142047 A1    Jun. 10, 2010

Related U.S. Application Data

(63) Continuation of application No. PCT/JP2008/062821, filed on Jul. 16, 2008.

(30) Foreign Application Priority Data

Aug. 23, 2007  (JP) .................................. 2007-217567

(51) Int. Cl.
*G02B 5/30*  (2006.01)
(52) U.S. Cl. .................................................. 359/485.05
(58) Field of Classification Search .................. None
See application file for complete search history.

(56) References Cited

U.S. PATENT DOCUMENTS

| | | | | |
|---|---|---|---|---|
| 3,016,071 A | * | 1/1962 | Kahn et al. | 359/497 |
| 3,047,860 A | * | 7/1962 | Swallow et al. | 342/5 |
| 4,260,991 A | * | 4/1981 | Dachert et al. | 343/756 |
| 4,565,745 A | | 1/1986 | Kaminskas | |
| 5,014,302 A | | 5/1991 | Kappeler et al. | |
| 5,251,065 A | * | 10/1993 | Uetsuki | 359/454 |
| 5,265,273 A | | 11/1993 | Goodwin et al. | |
| 5,444,570 A | * | 8/1995 | Uetsuki et al. | 359/483 |
| 5,771,027 A | * | 6/1998 | Marks et al. | 343/912 |
| 2003/0016358 A1 | | 1/2003 | Nagashima et al. | |
| 2003/0041367 A1 | | 3/2003 | Hadden et al. | |
| 2003/0094296 A1 | | 5/2003 | Kojima et al. | |
| 2003/0151898 A1 | | 8/2003 | Tetsuka et al. | |
| 2008/0014495 A1 | | 1/2008 | Saito et al. | |
| 2009/0136777 A1 | | 5/2009 | Fujii et al. | |

FOREIGN PATENT DOCUMENTS

JP        3114341 A        5/1991

(Continued)

OTHER PUBLICATIONS

International Search Report for PCT/JP2007/058943 mailed Jul. 17, 2007.

(Continued)

*Primary Examiner* — Lee Fineman
(74) *Attorney, Agent, or Firm* — Dickstein Shapiro LLP

(57) ABSTRACT

A textile made by weaving while crossing stainless wires as warp yarn and silk yarns as weft yarn one by one alternately, and this textile is attached to a frame body to configure a wire grid. The pitch for the stainless wires is determined depending on a wavelength to be polarized and analyzed. Furthermore, the silk yarns are removed if necessary. This configuration avoids problems with cutting of metal wire or irregular intervals between metal wires because of long fine metal wires tightened parallel to each other in the frame body, and problems such as multiple reflection or interference on a substrate or a base material because of fine wire patterns made by etching or the like with the use of the substrate or base material, thereby obtaining an easily-manufactured, low-cost and high-precision wire grid for polarization and analysis of electromagnetic waves.

13 Claims, 3 Drawing Sheets

FOREIGN PATENT DOCUMENTS

| | | |
|---|---|---|
| JP | 3047639 U | 4/1998 |
| JP | 2003-011538 | 1/2003 |
| JP | 2003-14620 | 1/2003 |
| JP | 2003-066228 A | 3/2003 |
| JP | 2006-078665 A | 3/2006 |
| JP | 2006-084776 A | 3/2006 |
| WO | WO-2006-033253 A1 | 3/2006 |
| WO | WO-2007-138813 A1 | 12/2007 |

OTHER PUBLICATIONS

Written Opinion of the International Search Authority (and English translation) for PCT/JP2007/058943, mailed dated Jul. 17, 2007.

PCT/JP2008/062821 Written Opinion dated Aug. 19, 2008.

PCT/JP2008/062821 International Search Report dated Aug. 19, 2008.

Fuji et al., "Texture of Wire-grid in THz Region Nishiijin Brocade Technology" Proceedings of 68th Academic Lecture hosted by Japan Society of Applied Physics, 2007.

N. Shimbun Polarization of 1.2 THz Electromagnetic Waves Optical Components made by Nishijin Brocade Technology, Aug. 31, 2007, p. 8, No. 70.

Yoshihara, "Physical Optics" (Kyoritsu Shuppan Co., Ltd) First Edition 1966, p. 216.

\* cited by examiner

WIRE GRID AND MANUFACTURING METHOD THEREOF

CROSS REFERENCE TO RELATED APPLICATIONS

The present application is a continuation of International Application No. PCT/JP2008/062821, filed Jul. 16, 2008, and claims priority to Japanese Patent Application No. JP2007-217567, filed Aug. 23, 2007, the entire contents of each of these applications being incorporated herein by reference in their entirety.

TECHNICAL FIELD

The present invention relates to a wire grid which is, for example, a terahertz band or millimeter-wave band polarization component, and a method for manufacturing the wire grid.

BACKGROUND ART

Wire grids are polarization components commonly used in the field of optics or electromagnetic waves, and disclosed in, for example, Non-Patent Document 1. Furthermore, Patent Document 1 discloses the use of a wire grid for a terahertz band ellipsometer.

FIG. 1 is a diagram illustrating the structure of a wire grid. The terahertz band wire grid has, as shown in FIG. 1, thin and long single metal wires 1 arranged at regular intervals with respect to a frame body 2. The metal wires 1 are, for example, tungsten wires of 5 µm to 50 µm in diameter, which are one by one attached to a metallic frame body with an adhesive at a pitch on the order of 10 to 100 µm.

The diameter of the metal wire and the pitch for the metal wire are determined depending on the wavelength used. In the terahertz band, the metal wire has a diameter on the order of 10 to 300 µm, and a pitch on the order of 30 µm to 1 mm.

Patent Document 1: Japanese Patent Application Laid-Open No. 2003-14620

Non-Patent Document 1: Kunio Yoshihara, "Physical Optics", (KYORITSU SHUPPAN CO., LTD., the first edition in 1966) p. 216

When such a wire grid is used as a terahertz band polarizer, the size of the wire grid ranges from 20 mm to approximately 100 mm in diameter. In the case of a wire grid with a diameter of 100 mm, metal wires have a length of about 100 mm, and it is thus difficult to tighten the long thin metal wires parallel to each other. More specifically, the tension easily cuts the metal wires, or causes an interval between the metal wires to get irregular, thus leading to difficulty in manufacture. Therefore, the wire grid will be very expensive as a component.

On the other hand, there are sold wire grids which are made by forming a thin film on a substrate through which electromagnetic waves are to be transmitted and making the thin film into fine wire patterns by etching or the like. Furthermore, there are also sold wire grids which are made by dispersing metal grain in a base material such as resin or glass, and making the base material into fine wires in the base material by stretching or the like. In the structures with these substrate or base material, phenomena such as multiple reflection or interference occur due to physical properties such as the index of refraction, reflectivity, and absorption index of the substrate or base material. Therefore, special treatment will be required in order to avoid the phenomena.

Furthermore, both the wire grid with the use of the metal wires and the wire grid with the use of the substrate or base material are limited in size up to a diameter on the order of 100 to 150 mm, and it is difficult to make larger wire grids over the size limit.

SUMMARY OF THE INVENTION

Thus, an object of the present invention is to solve the problem with the use of the wires described above and the problem with the use of the substrate or base material, and provide an easily-manufactured, low-cost, and even high-precision wire grid for polarization and analysis of electromagnetic waves and a manufacturing method for the wire grid.

A first aspect of the present invention provides a wire grid for polarization and analysis of electromagnetic waves, wherein a warp yarn and a weft yarn are crossed to make a textile, and one of the warp yarn and the weft yarn includes a conductive fine wire whereas the other includes an insulating yarn.

This aspect allows long conductive fine wires to be arranged parallel to each other at regular intervals, without the use of a frame body for applying a tension to fine metal wires as in conventional wire grids. Furthermore, with the textile as a whole, a wire grid of predetermined size can be easily manufactured by cutting the textile. Moreover, the textile can be shaped into a three-dimensional shape. More specifically, the degrees of freedom in size and shape are significantly improved. Furthermore, low-cost wire grids are obtained by virtue of ease in manufacture.

The conductive fine wire may be a metal wire, and the insulating yarn may be twine of an insulating fiber.

This aspect allows highly conductive fine wires to be made, resulting in favorable polarization and analysis characteristics. Furthermore, the insulating yarn including twine of an insulating fiber can enhance the compatibility with looms, and conventional looms can be thus used as they are for the manufacture. Therefore, lager wire grids can be made.

The conductive fine wire has a pitch determined within the range of 30 µm to 3 mm. Thus, a frequency with electromagnetic waves of 100 GHz to 10 THz can be polarized and analyzed.

A second aspect of the present invention provides a wire grid for polarization and analysis of electromagnetic waves, wherein a warp yarn and a weft yarn are crossed to make a textile, the warp yarn and the weft yarn include conductive fine wires, and the interval from one weft yarn to another is made 5 or more times as long as a wavelength of an electromagnetic wave to be transmitted.

This aspect makes the wavelength at which the conductive weft yarn acts as a grid 5 or more times as long as the target wavelength, and thus has almost no adverse effect on polarization and analysis characteristics for the target wavelength.

A third aspect of the present invention provides a method for manufacturing a wire grid for polarization and analysis of electromagnetic waves, the method including the steps of:
  preparing a conductive fine wire;
  preparing an insulating yarn; and
  making the conductive fine wire and the insulating yarn into a textile by using a loom.

This aspect allows wire grids for polarization and analysis of electromagnetic waves to be manufactured by using a loom for weaving with twine of a normal fiber.

The method for manufacturing a wire grid further includes the step of removing the insulating yarn after the textile is made.

When the textile is held as it is in the frame body, the conductive fine wire can be held even after the insulating yarn is removed. Thus, the removal of the insulating yarn provides a wire grid for polarization and analysis of electromagnetic waves with its electromagnetic characteristics unaffected by the insulating yarn.

According to the present invention, an easily-manufactured, low-cost and high-precision wire grid for polarization and analysis of electromagnetic waves is obtained without problems with cut metal wires or irregular intervals between metal wires because of long fine metal wires tightened parallel to each other in a frame body or problems such as multiple reflection or interference on a substrate or a base material because of fine wire patterns made by etching or the like with the use of the substrate or base material.

DESCRIPTION OF REFERENCE SYMBOLS 1 metal wire
2, 20 frame body
10 wire grid fabric
11 stainless wire (warp yarn)
12 silk yarn (weft yarn)
13 stainless wire (weft yarn)
20 frame body
100, 101, 102 wire grid

DETAILED DESCRIPTION OF THE INVENTION

First Embodiment

A metal plate for a wire grid and a method for manufacturing the wire grid according to a first embodiment will be described with reference to FIGS. 2 to 4.

Figure 1:
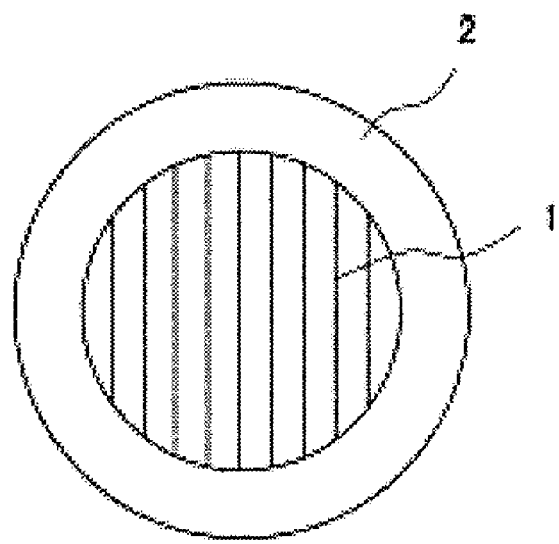
FIG. 1 is a plan view of a conventional wire grid.
Figure 2:
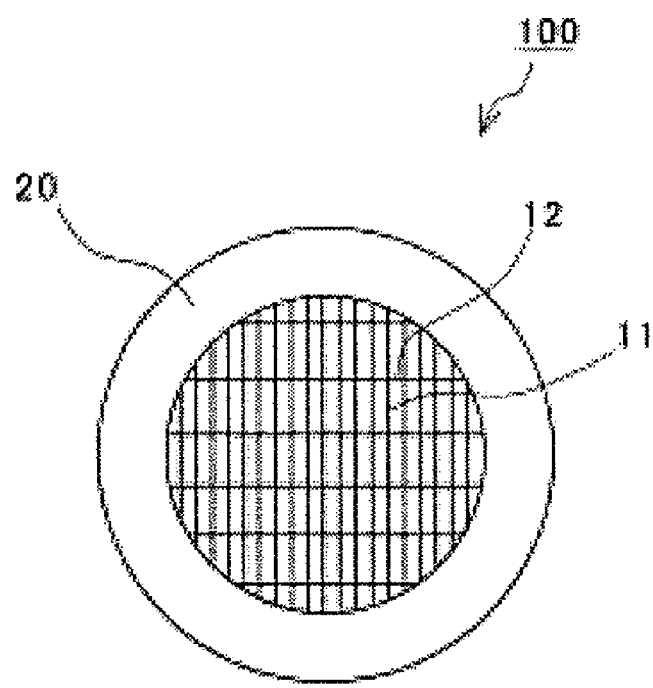
FIG. 2 is a plan view of a wire grid according to a first embodiment.

FIG. 2 is a plan view of a wire grid 100 according to the first embodiment. This wire grid 100 is obtained by attaching a textile to a ring frame body 20, the textile including a plurality of stainless steel wires (hereinafter, simply referred to as stainless wires) 11 extending vertically and silk yarns 12 extending horizontally while crossing one by one alternately with respect to the stainless wires 11.

When the wire grid 100 shown in FIG. 2 is used as a polarizer or analyzer, electromagnetic waves are made incident in a direction perpendicular to a surface of the wire grid 100. With incident electromagnetic waves having a plane of polarization parallel to the stainless wires 11 of the wire grid 100, the electric field component of the electromagnetic waves generates an electric current in the stainless wires 11. Therefore, the electric field component is reflected or absorbed and the electromagnetic waves are not transmitted. On the other hand, since the width (diameter) of the stainless wires (11) is significantly shorter than (about ¹⁄₁₀ or less of) the wavelength, the loss due to an electric current flowing in the stainless wires 11 can be mostly ignored with incident electromagnetic waves having a plane of polarization perpendicular to the stainless wires 11. Therefore, the electromagnetic waves are transmitted as they are. In this way, the wire grid 100 acts as a polarizer or analyzer.

Figure 3A:
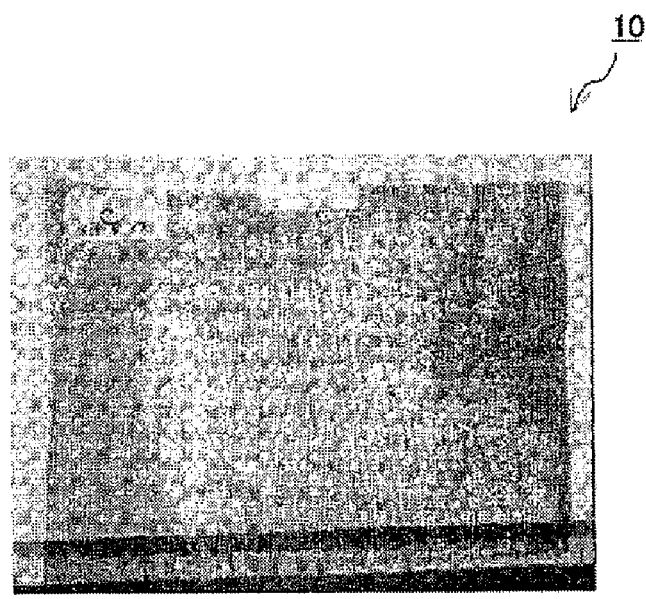
FIG. 3(A) is a plan view (photograph) of a wire grid fabric for use in the wire grid.
Figure 3B:
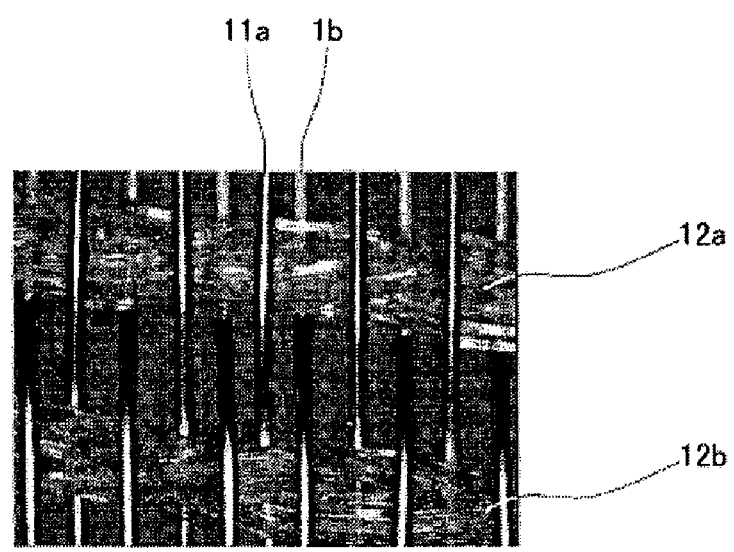
FIG. 3(B) is an enlarged view (photograph) of the wire grid fabric.

FIG. 3(A) is a plan view (photograph) of a wire grid fabric for use in the wire grid 100 shown in FIG. 2, whereas FIG. 3(B) is an enlarged view (photograph) of the wire grid fabric.

The wire grid fabric 10 shown in FIG. 3(A) is a textile made by using a loom with a stainless wire as warp yarn and a silk yarn as weft yarn.

This wire grid fabric 10 is manufactured as follows.

First, a warp yarn feeding mechanism is set so that a stainless wire (warp yarn) wound around a yarn feeder such as a bobbin is fed to a loom while keeping a predetermined tension, and plain weave is carried out by alternating pull up and down of a heddle and passing of a shuttle for a silk yarn (weft yarn). As this loom, Jacquard loom can be used.

The pitch for the stainless wires $11a$, $11b$ is selected within the range of 30 μm to 3 mm so that electromagnetic waves of 10 GHz to 10 THz can be polarized and analyzed. When the pitch is 30 μm, the wavelength is 120 μm in the case of 30 μm for the ¼ wavelength, thus allowing a 2.5 THz frequency band to be polarized and analyzed. Alternatively, when the pitch is 3 mm, the wavelength is 12 mm in the case of 3 mm for the ¼ wavelength, thus allowing a 25 GHz frequency band to be polarized.

This textile is made by plain weave as shown in FIG. 3(B), in such a way that the stainless wires $11a$, $11b$ are arranged at a predetermined pitch and the stainless wires $11a$, $11b$ and silk yarns (twine of silk fibers) $12a$, $12b$ are crossed one by one. In this example, the pitch for the stainless wires $11a$, $11b$ as warp yarn and the pitch for the silk yarns $12a$, $12b$ as weft yarn have a relationship of about 1:5. This pitch is determined in view of issues as described next.

The smaller the ratio of the pitch for the silk yarns $12a$, $12b$ to the pitch for the stainless wires $11a$, $11b$ is, the relatively more the stainless wires $11a$, $11b$ is flexed. The degree of the flexing is affected by the thicknesses and degrees of hardness of the stainless wires $11a$, $11b$ and silk yarns $12a$, $12b$. For example, when the stainless wires and silk yarns can be woven by using a loom for Nishijin silk fabrics, it is preferable that the ratio between the pitches be 1:1 or more.

Furthermore, the larger the ratio of the pitch for the silk yarns $12a$, $12b$ to the pitch for the stainless wires $11a$, $11b$ is, the larger the interval between the positions of supporting the stainless wires $11a$, $11b$ by the silk yarns $12a$, $12b$ is, and the stainless wires $11a$, $11b$ will be thus likely to undergo deflection. The degree of the deflection is affected by the thicknesses and degrees of hardness of the stainless wires $11a$, $11b$ and silk yarns $12a$, $12b$. For example, when the stainless wires and silk yarns can be woven by using a loom for Nishijin silk fabrics, it is preferable that the ratio between the pitches be 1:10 or less.

Furthermore, it is preferable that the diameter of the stainless wire be adjusted so that when the pitch dimension and diameter of the stainless wire are respectively denoted by d and a, the ratio d/a has a value on the order of 2 to 4. When this value is less than 2, the transmittance of electromagnetic waves in the polarization direction desired to be transmitted will be less than a transmittance generally required by a polarizer or analyzer for electromagnetic waves of 10 GHz to 10 THz. When this value is greater than 4, the transmittance of electromagnetic waves in the polarization direction desired to be blocked will be greater as compared with the transmittance generally required by a polarizer or analyzer for electromagnetic waves of 10 GHz to 10 THz.

The wire grid shown in FIG. 2 is obtained by fitting the wire grid fabric 10 as shown in FIG. 3(A) in the frame body 20. The wire grid fabric 10 may be any wire grid fabric as long as the size of the wire grid fabric is larger than the opening of the frame body 20, and it is also possible to cut the wire grid fabric 10. Thus, the wire grid 100 of arbitrary size can be easily made depending on the size of the frame body 20.

According to this embodiment, because the warp yarn is able to keep the arrangement pitch constant with a high degree of accuracy as compared with the weft, a wire grid with a high-precision grid pitch is obtained by using a stainless wire (conductive yarn) for the warp yarn and a silk yarn (insulating yarn) for the weft yarn.

According to the present invention, for example, a textile (piece goods) with a width of 1 m or more and a length of 1 m or more can be made at one time. Thus, the present invention provides a quite high production efficiency, and allows reduction in cost. Furthermore, the present invention eliminates the need for a frame body for applying a tension to fine metal wires to arrange the wires, as in conventional wire grids. Furthermore, with the textile as a whole, a wire grid of predetermined size can be easily manufactured by cutting the textile. Moreover, the textile can be shaped into a three-dimensional structure such as, for example, a parabolic shape.

Figure 4:
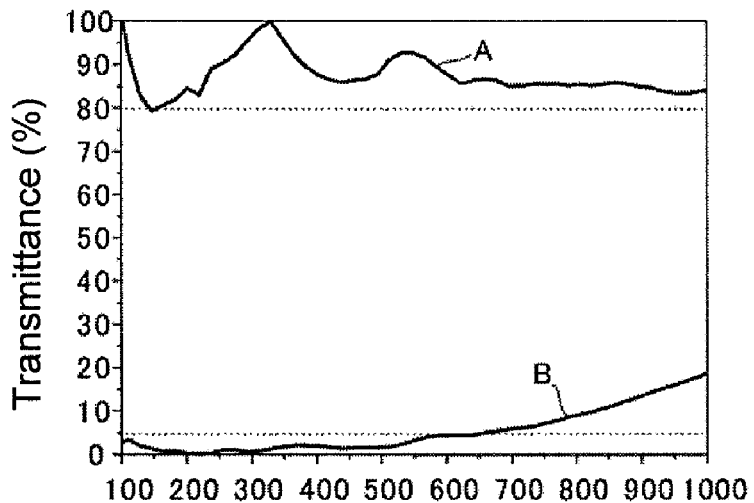
FIG. 4 is a diagram showing characteristics of the wire grid.

FIG. 4 is a diagram showing an example of polarization and analysis characteristics of the wire grid according to the first embodiment. In FIG. 4, the horizontal axis indicates the frequency of an incident electromagnetic wave, whereas the vertical axis indicates a transmittance %. In FIG. 4, A indicates the transmittance of electromagnetic waves (light) with the electric field direction of incident light perpendicular to the stainless wire, whereas B indicates the transmittance of electromagnetic waves (light) with the electric field direction of incident light parallel to the stainless wire.

In this example, the diameter and pitch of the stainless wire were 30 μmm and 10 wires/mm.

Thus, polarized waves were allowed to be transmitted at a transmittance of 80% or more over a range of 10 GHz to 1000 GHz, and polarized waves were blocked at a transmittance of 5% or less over a range of 100 GHz to 650 GHz.

It is to be noted that while the single stainless wire is used as the conductive fine line in the example described above, other metal wires such as tungsten wires, carbon twine including carbon fibers, further, conductive organic fibers, etc. can be also be similarly applied.

Furthermore, while the silk yarn is used as the insulating yarn, in addition, natural fibers such as cotton yarn and wool, as well as synthetic fibers such as polyethylene and polyester can also be similarly applied. In general, the use of a synthetic fiber increases the durability, and suppresses changes in characteristics with respect to environmental changes since the synthetic fiber is less hygroscopic.

Moreover, while the conductive yarn and the insulating yarn are used respectively for the warp yarn and weft yarn, the insulating yarn and the conductive yarn may be reversely used respectively for the warp yarn and weft yarn. More specifically, weaving may be carried out by using a loom with the use of the insulating yarn such as a silk yarn for the warp yarn and of the conductive yarn such as a stainless wire for the weft yarn.

Second Embodiment

A metal plate for a wire grid and a method for manufacturing the wire grid according to a second embodiment will be described with reference to FIG. 5.

While the wire grid fabric with the insulating yarns left in place is used in the first embodiment, this second embodiment provides a wire grid fabric fixed in a frame body with insulating yarns removed.

Figure 5:
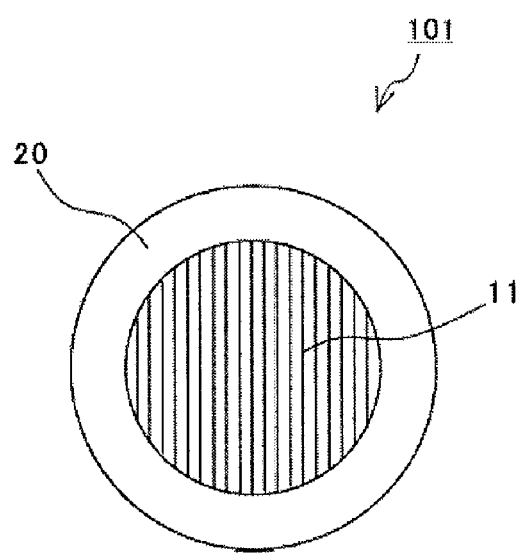
FIG. 5 is a plan view of a wire grid according to a second embodiment.

FIG. 5 is a plan view of a wire grid 101 according to the second embodiment. This wire grid 101 is obtained by attaching a textile to a ring frame body 20 and then removes the silk yarns, the textile including a plurality of stainless wires 11 extending vertically and silk yarns 12 extending horizontally while crossing one by one alternately with respect to the stainless wires 11.

Specifically, processing such as burning the insulating yarns causes the yarns to substantially disappear. Alternatively, chemically soluble yarns are used as the insulating yarns, and the insulating yarns are dissolved in a liquid, with the wire grid fabric fixed in the frame body.

As described above, the wire grid 101 configured to have only the conductive yarns arranged at a predetermined pitch is not to be electromagnetically affected by the insulating yarns. Therefore, the electromagnetically influential insulating yarns can also be used to weave textiles, and the wire grid 101 thus has higher degrees of freedom for the material, thickness, arrangement pitch, and the like of the insulating yarns.

Third Embodiment

While the textile with the conductive yarns and the insulating yarns is used in the first and second embodiments, the third embodiment uses conductive yarns for both warp yarn and weft yarn.

Figure 6:
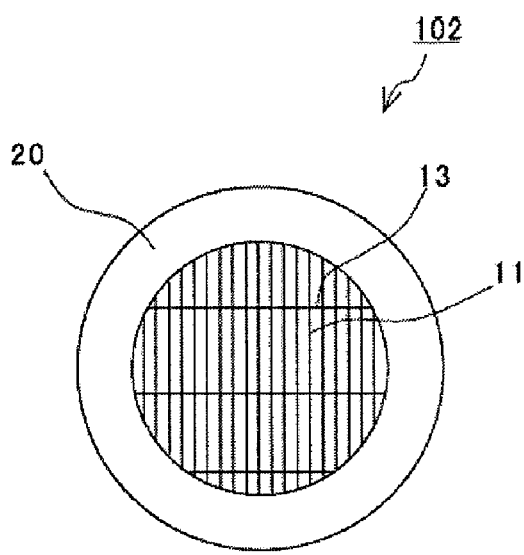
FIG. 6 is a plan view of a wire grid according to a third embodiment.

FIG. 6 is a plan view of a wire grid 102 according to the third embodiment. This wire grid 102 is obtained by attaching a textile to a ring frame body 20, the textile including a plurality of stainless wires 11 extending vertically and stainless wires 13 extending horizontally while crossing one by one alternately with respect to the stainless wires 11.

The pitch for the stainless wires 11 as warp yarn is made to have the ¼ wavelength of a wavelength to be polarized and analyzed, whereas the pitch for the stainless wires 13 as weft yarn is made 10 times as long as a wavelength to be polarized. When the pitch for the stainless wires 13 as weft yarn is 5 or more times as long as the wavelength, the increase in loss due to the existence of the stainless wires 13 can be suppressed to an increase on the order of several %, and the loss is further reduced by making the pitch 10 or more times as long as the wavelength.

With this configuration, the stainless wires 13 as weft yarn have no adverse effect on polarization and analysis characteristics for the target wavelength, the increase in loss due to the existence of the stainless wires 13 can be mostly ignored, and the wire grid can be directly used for a wire grid for polarization and analysis of electromagnetic waves.

While the pitch for the weft yarn is greater than the pitch for the warp yarn in the example shown in FIG. 6, the reverse relationship may be employed.

It is to be noted that while the plain-woven textile includes warp yarn and weft yarn in each embodiment described above, twill weave or satin weave may be employed besides plain weave when the conductive yarn is used as the warp yarn. Alternatively, even when the conductive yarn is used as the weft yarn, twill weave or satin weave may be employed in such a way that the conductive yarn is arranged at a predetermined pitch.

Furthermore, a plating process such as gold plating may be applied to the conductive yarns after the textile is made. The application of the plating process allows the conductivity to be increased, and suppresses degradation in characteristics due to aged deterioration and environment.

The invention claimed is:
1. A wire grid comprising:
a warp yarn and a weft yarn crossed to make a textile that is configured to allow transmittance of 80% or more of polarized waves over a range of 10 GHz to 1000 GHz, and block transmittance of 5% or less of the polarized waves over a range of 100 GHz to 650 GHz, wherein one of the warp yarn and the weft yarn includes a conductive fine wire and the other of the warp yarn and the weft yarn includes an insulating yarn, and wherein a ratio of a pitch of the conductive fine wire to a diameter of the conductive fine wire is from 2 to 4.
2. The wire grid according to claim 1, wherein the conductive fine wire is a metal wire.
3. The wire grid according to claim 2, wherein the insulating yarn is twine of an insulating fiber.
4. The wire grid according to claim 1, wherein the insulating yarn is twine of an insulating fiber.
5. The wire grid according to claim 1, wherein the conductive fine wire has a pitch within the range of 30 μm to 3 mm.
6. The wire grid according to claim 1, wherein a ratio of a pitch of the warp yarn to a pitch of the weft yarn is 1:10 or less.
7. A wire grid comprising:
a warp yarn and a weft yarn crossed to make a textile that is configured to allow transmittance of 80% or more of polarized waves over a range of 10 GHz to 1000 GHz, and block transmittance of 5% or less of the polarized waves over a range of 100 GHz to 650 GHz, wherein the warp yarn and the weft yarn each include a conductive fine wire, an interval between adjacent weft yarns is 5 or more times as long as a wavelength of an electromagnetic wave transmitted through the wire grid, and a ratio of a pitch of the conductive fine wire to a diameter of the conductive fine wire is from 2 to 4.
8. The wire grid according to claim 7, wherein the conductive fine wire is a metal wire.
9. The wire grid according to claim 7, wherein the conductive fine wire has a pitch within the range of 30 μm to 3 mm.
10. The wire grid according to claim 7, wherein a ratio of a pitch of the warp yarn to a pitch of the weft yarn is 1:10 or less.
11. A method for manufacturing a wire grid, the method comprising:
providing a conductive fine wire, wherein a ratio of a pitch of the conductive fine wire to a diameter of the conductive fine wire is from 2 to 4;
providing an insulating yarn; and
weaving the conductive fine wire and the insulating yarn into a textile that is configured to allow transmittance of 80% or more of polarized waves over a range of 10 GHz to 1000 GHz, and block transmittance of 5% or less of the polarized waves over a range of 100 GHz to 650 GHz by using a loom.
12. The method for manufacturing a wire grid according to claim 11, further comprising the step of attaching the textile to a frame after the textile is made.
13. The method for manufacturing a wire grid according to claim 12, further comprising the step of removing the insulating yarn.

* * * * *